United States Patent
Chun et al.

(10) Patent No.: US 11,183,310 B2
(45) Date of Patent: Nov. 23, 2021

(54) BOTTOM NOZZLE OF NUCLEAR FUEL ASSEMBLY PROVIDED WITH FLOW HOLES BY UTILIZING LAYERED AIRCRAFT AIRFOIL STRUCTURE

(71) Applicants: Joo Hong Chun, Daejeon (KR); Seong Soo Kim, Daejeon (KR); Su Pil Ryu, Daejeon (KR); Do Gwan Lee, Daejeon (KR); Nam Gyu Park, Daejeon (KR); Jong Sung Yoo, Daejeon (KR)

(72) Inventors: Joo Hong Chun, Daejeon (KR); Seong Soo Kim, Daejeon (KR); Su Pil Ryu, Daejeon (KR); Do Gwan Lee, Daejeon (KR); Nam Gyu Park, Daejeon (KR); Jong Sung Yoo, Daejeon (KR)

(73) Assignee: KEPCO NUCLEAR FUEL CO., LTD., Daejeon (KR)

( * ) Notice: Subject to any disclaimer, the term of this patent is extended or adjusted under 35 U.S.C. 154(b) by 32 days.

(21) Appl. No.: 16/731,206

(22) Filed: Dec. 31, 2019

(65) Prior Publication Data
US 2020/0227180 A1 Jul. 16, 2020

(30) Foreign Application Priority Data
Jan. 16, 2019 (KR) .......................... 10-2019-0005485

(51) Int. Cl.
*G21C 3/32* (2006.01)
*G21C 3/33* (2006.01)

(52) U.S. Cl.
CPC ......... *G21C 3/3206* (2013.01); *G21C 3/3305* (2013.01)

(58) Field of Classification Search
CPC .... G21C 3/3206; G21C 3/3305; G21C 3/322; Y02E 30/30; B01D 29/0004; B01D 29/445; B01D 39/10; B01D 39/12
USPC ......................................... 210/489, 498, 499
See application file for complete search history.

(56) References Cited

U.S. PATENT DOCUMENTS

| 5,345,483 | A | * | 9/1994 | Johansson | G21C 19/307 376/313 |
| 5,488,634 | A | * | 1/1996 | Johansson | G21C 3/3206 376/313 |
| 5,539,793 | A | * | 7/1996 | Johansson | G21C 3/3206 376/443 |
| 5,867,551 | A | * | 2/1999 | Toshihiko | G21C 3/3206 376/352 |
| 6,000,094 | A | * | 12/1999 | Young | A47L 13/58 15/260 |
| 2002/0136349 | A1 | | 9/2002 | Oh et al. | |

(Continued)

FOREIGN PATENT DOCUMENTS

KR 10-2000-0061665 A 10/2000
KR 1020050105188 A 11/2005

*Primary Examiner* — Darlene M Ritchie
(74) *Attorney, Agent, or Firm* — Reinhart Boerner Van Deuren P.C.

(57) ABSTRACT

Embodiments of a bottom nozzle of a nuclear fuel assembly provided with flow holes by utilizing a layered aircraft airfoil structure are provided. The bottom nozzle not only increases efficiency of filtering foreign substances by minimizing a size of the flow holes by constituting a shape of flow holes into cross stripes but also prevents coolant water flow velocity drop through prevention of coolant water pressure drop by constituting a lateral sectional shape of the grid frames constituting the cross stripes into an aircraft airfoil type.

1 Claim, 7 Drawing Sheets

(56) References Cited

U.S. PATENT DOCUMENTS

2006/0056574 A1   3/2006  Kemner et al.
2014/0056397 A1*  2/2014  Friedrich ............. G21C 3/3206
                                               376/313

* cited by examiner

BOTTOM NOZZLE OF NUCLEAR FUEL ASSEMBLY PROVIDED WITH FLOW HOLES BY UTILIZING LAYERED AIRCRAFT AIRFOIL STRUCTURE

CROSS REFERENCE TO RELATED APPLICATION

The present application claims priority to Korean Patent Application No. 10-2019-0005485, filed Jan. 16, 2019, the entire contents of which is incorporated herein for all purposes by this reference.

FIELD

The present invention relates to a bottom nozzle of a nuclear fuel assembly provided with flow holes by utilizing a layered aircraft airfoil structure. More particularly, the present invention relates to a bottom nozzle of a nuclear fuel assembly provided with flow holes by utilizing a layered aircraft airfoil structure that prevents a coolant water flow velocity drop through prevention of coolant water pressure drop while increasing efficiency of filtering foreign substances.

BACKGROUND

A nuclear reactor is a device using heat energy generated from fission as power by artificially controlling a chain fission reaction of fissile material.

Nuclear fuel used in the nuclear reactor is manufactured by forming concentrated uranium into cylindrical pellets of a predetermined size and then charging a plurality of pellets into fuel rods. A plurality of fuel rods constituting fuel assemblies is loaded into the reactor core and then burned up through nuclear reactions.

With reference to FIG. 1, in general, a nuclear fuel assembly includes a plurality of fuel rods arranged in an axial direction, a plurality of support grids 30 provided in the lateral direction of the fuel rods and supporting the fuel rods; a plurality of guide tubes 10 fixed to the support grids 30 and constituting the skeleton of the assembly and an instrumentation tube 20 inserted into the center of the support grid 30; a top nozzle 40 and a bottom nozzle 50 supporting the top and bottom ends, respectively, of the guide tube 10 and the instrumentation tube 20.

A nuclear fuel assembly consists of approximately a number of 200 or more fuel rods, and enriched uranium is formed into a pellet of a predetermined size and charged into each fuel rod.

The top nozzle 40 and the bottom nozzle 50 are for supporting the upper and lower ends, respectively, of the guide tube 10, and in order to prevent an occurrence of the lifting of the fuel assembly by the hydraulic pressure of the coolant water flowing to the upper portion through the lower portion of the nuclear fuel assembly, the top nozzle 40 is provided with a plurality of elastic bodies, thereby functioning to press and fix the upper end portion of the nuclear fuel assembly.

The bottom nozzle 50 fixes and supports a lower end portion of the guide tube 10 and provides holes through which the guide tube 10 and the instrumentation tube 20 are inserted and a plurality of flow holes to which the coolant water is supplied.

With reference to FIGS. 2A and 2B, the bottom nozzle 50 will be described in detail.

The bottom nozzle 50 is provided with guide holes 51 and an instrumentation hole 52 to which the guide tubes 10 and the instrumentation tube 20 are connected, respectively, and flow holes 53 that are each openings for coolant water to pass through.

By such a configuration, the coolant water flows into a fuel rod region through the flow holes 53 and removes the heat generated from the fuel rods while passing between the fuel rods.

At this time, when the coolant water flows into the fuel rod region through the flow holes 53, foreign substances remaining in the coolant water also enter the fuel rod region along the same path as that of the coolant water.

That is, various types of foreign substances flowing together with the coolant water during the operation of the reactor pass through the flow holes 53 and enter the region where the fuel rods of the fuel assembly are located, and may be caught between the fuel rod and the fuel rod, or between the lowermost support grid of the fuel assembly and the fuel rod.

When a foreign substance having a relatively large size is introduced between fuel rods along with the coolant water through the flow holes 53, the foreign substance is in vibrating contact with an adjacent fuel rod cladding, thereby causing mechanical wear of the nuclear fuel rod cladding resulting in damage to the cladding.

As such, the kinds of foreign substances that may damage the fuel rods are very diverse, such as metal chips after cutting, debris generated during welding, bolts, nuts, nails, hacksaw pieces, and the like.

When the fuel rod cladding is damaged, fission products generated by the nuclear reaction of the nuclear material in the fuel rod flow out of the fuel rod cladding to contaminate the coolant water with radioactive materials. Subsequently, contaminated coolant water contaminates the entire primary coolant water while circulating through the primary cooling system of a nuclear power plant.

In order to prevent such a problem, the flow holes 53 are being designed to have various shapes such as a mesh to filter foreign substances generated in the reactor.

However, the related art has following problems. First, the design of the flow holes 53 for improving the efficiency of filtering foreign substances decreases the coolant water pressure, whereby a smooth flow of the coolant water is not accomplished. Next, the design of the flow holes 53 for preventing a pressure drop of the coolant water reduces the efficiency of filtering foreign substances.

The foregoing is intended merely to aid in the understanding of the background of the present invention, and is not intended to mean that the present invention falls within the purview of the related art that is already known to those skilled in the art.

DOCUMENTS OF RELATED ART

[Patent Document] Korean Patent Application Publication No. 10-2000-0061665

BRIEF SUMMARY

Accordingly, the present invention has been made to solve the above problems occurring in the related art, and an objective of the present invention is to provide a bottom nozzle of a nuclear fuel assembly provided with flow holes by utilizing a layered aircraft airfoil structure that minimizes a size of flow holes through a stacking and crossing configuration, thereby allowing efficiency of filtering foreign substances to be maximized and, at the same time, prevents coolant water pressure from being dropped through the flow holes, thereby ensuring a smooth flow of coolant water.

In order to achieve the above objective according to one aspect of the present invention, there is provided the bottom nozzle of the nuclear fuel assembly provided with flow holes by utilizing the layered aircraft airfoil structure, the bottom nozzle of the nuclear fuel assembly including: a plurality of flow holes, wherein the flow holes are constituted in a shape of cross stripes, wherein a plurality of grid frames constituting the cross stripes may be constructed by being stacked while crossing the flow holes, and a lateral sectional shape of the grid frames may be a streamlined shape of an aircraft airfoil type.

In this case, the grid frames may be constructed by stacking first grid frames and second grid frames.

In addition, the lateral sectional shape of the grid frames may be provided to be curved to expand from a direction coolant water flows in and then to become pointy by being tapered again.

As described above, the bottom nozzle of a nuclear fuel assembly provided with flow holes by utilizing a layered aircraft airfoil structure according to the present invention has the following effects.

First, the size of the flow holes is minimized by designing the flow holes in a shape of cross stripes, wherein a lateral cross section of the grid frames constituting the cross stripes is applied with a cross section of a shape of the aircraft airfoil.

Accordingly, there are effects such that since the pressure drop of the coolant passing through the flow holes constituted by the grid frames does not occur, a smooth flow of the coolant water can be performed, and due the flow holes constituted in a shape of cross stripes, efficiency of filtering the foreign substances can be increased.

Second, a plurality of the grid frames constituting the flow holes is stacked in a height direction of the bottom nozzle, wherein the grid frames are installed to cross each other on the flow holes, thereby causing an effect to further increase the efficiency of filtering the foreign substances.

BRIEF DESCRIPTION OF THE DRAWINGS

The above and other objectives, features and other advantages of the present invention will be more clearly understood from the following detailed description when taken in conjunction with the accompanying drawings, in which.

DETAILED DESCRIPTION

Figure 1:
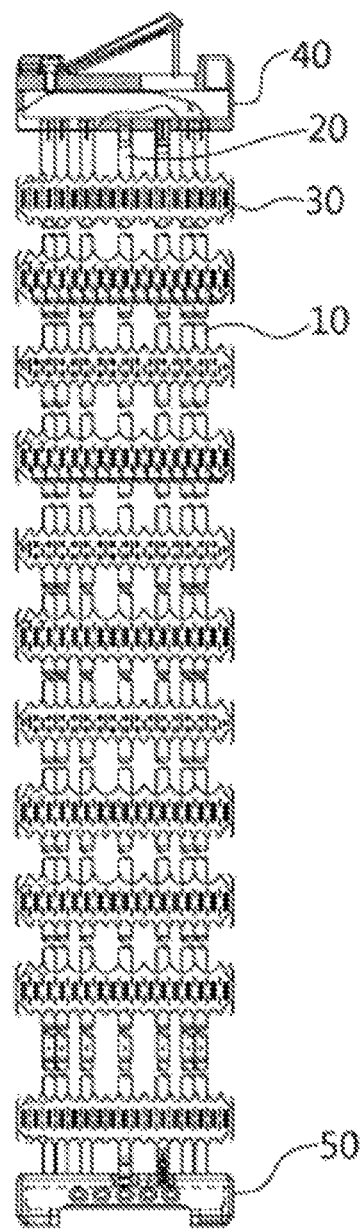
FIG. 1 is a view showing a typical nuclear fuel assembly.
Figure 2A:
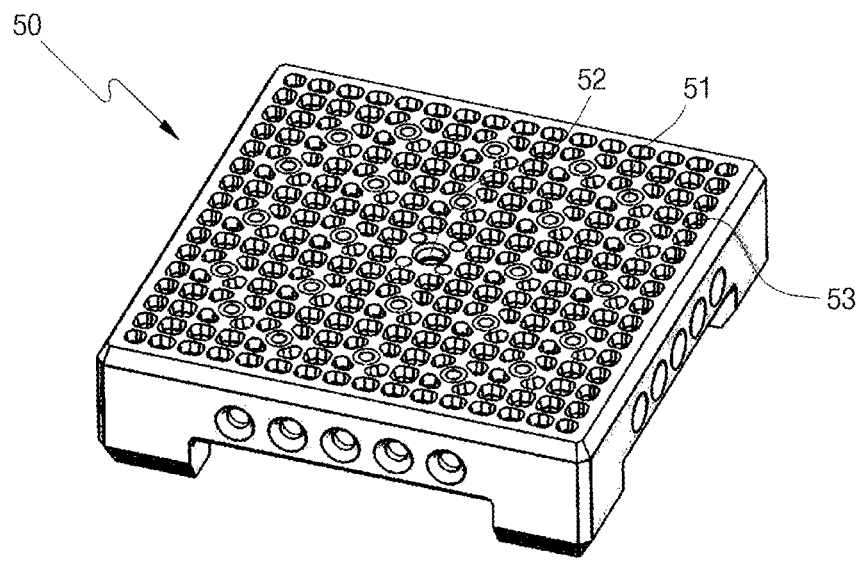
FIG. 2A is a perspective view showing a bottom nozzle of the nuclear fuel assembly according to a conventional art.
Figure 2B:
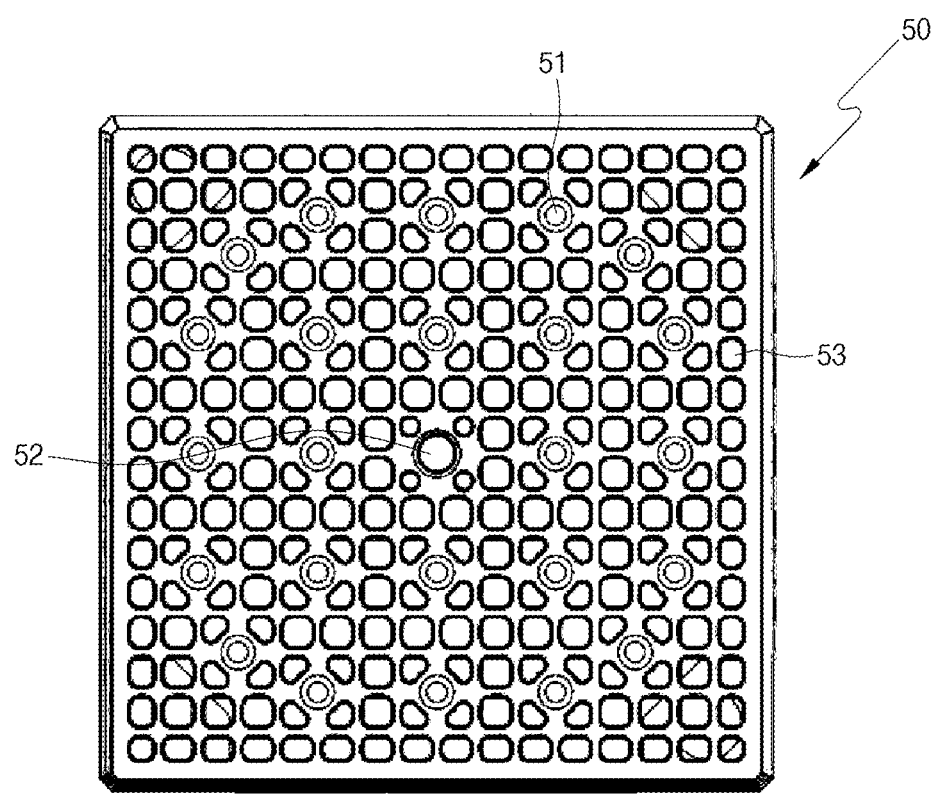
FIG. 2B is a plan view showing the bottom nozzle of the nuclear fuel assembly according to the conventional art.

Terms or words used in the present specification and claims are not to be construed as being limited to usual or dictionary meanings thereof. Based on a principle that the inventors may properly define the concept of terms in order to best explain invention thereof in the best way possible, the terms or words should be interpreted as having a meaning and concept corresponding to the technical idea of the present invention.

Hereinbelow, a bottom nozzle of a nuclear fuel assembly provided with flow holes by utilizing a layered aircraft airfoil structure (hereinafter, referred to as "bottom nozzle") according to exemplary embodiments of the present invention will be described in detail with reference to the accompanying FIGS. 3 to 7. Throughout the drawings, the same reference numerals will refer to the same or like parts.

The bottom nozzle 100 minimizes a size of flow holes 200, thereby increasing efficiency of filtering foreign substances and also ensures a smooth flow of coolant water by preventing coolant water pressure from being dropped when the coolant water flow passes through the flow holes.

Therefore, both of the coolant water flow and the efficiency of filtering foreign substances may be increased.

The bottom nozzle 100 is provided with the flow holes 200 through which the coolant water flows therein.

Figure 3:
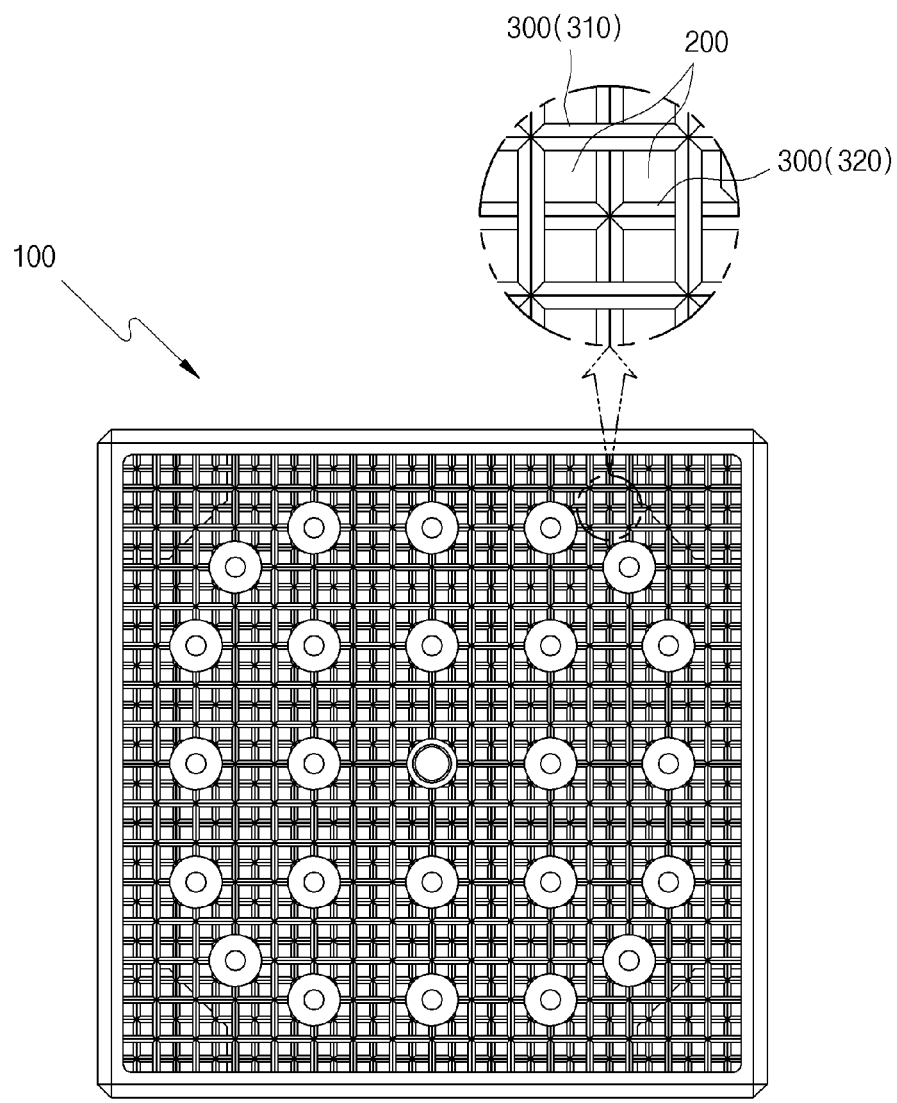
FIG. 3 is a plan view showing a bottom nozzle of a nuclear fuel assembly provided with flow holes by utilizing a layered aircraft airfoil structure according to an exemplary embodiment of the present invention.

In this case, the flow holes 200 are provided in a shape of cross stripes as shown in FIG. 3.

That is, grid frames 300 are provided in the shape of cross stripes on a flow plate, thereby providing flow holes 200 each in a shape of a square.

As such, as the flow holes 200 are provided in the shape of cross stripes, the size of the flow holes 200 through which the coolant water passes may be minimized by increasing thickness of the grid frames 300, and the efficiency of filtering the foreign substances may be maximized accordingly.

On the other hand, the grid frames 300 providing the flow holes 200 are constructed by being stacked in a height direction of the bottom nozzle 100.

In this case, the grid frames 300 are installed crossing the flow holes 200 while being stacked.

By such a constitution, the flow holes 200 are constituted by being divided by a cross shape through the grid frames 300 neighboring in a height direction as shown in FIGS. 3 to 7.

By constructing the grid frames 300 stacked as described above to cross each other, the size of the flow holes 200 may be minimized, thereby increasing the efficiency of filtering the foreign substances.

The pressure drop of the coolant water is also to be taken into consideration as the grid frames 300 are stacked in a plurality of layers, so the grid frames 300 may be composed of two layers.

In this case, for convenience of description, the grid frame 300 installed on the uppermost of the bottom nozzle 100 is referred to as a first grid frame 310, and the grid frame 300 installed under the first grid frame 310 is referred to as a second grid frame 320.

On the other hand, the flow holes 200 need to not only maximize the efficiency of filtering the foreign substances but also prevent the pressure drop when the coolant water flows through the flow holes 200, so the grid frames 300 providing the flow holes 200 is formed in a streamlined shape of an aircraft airfoil.

Figure 4:
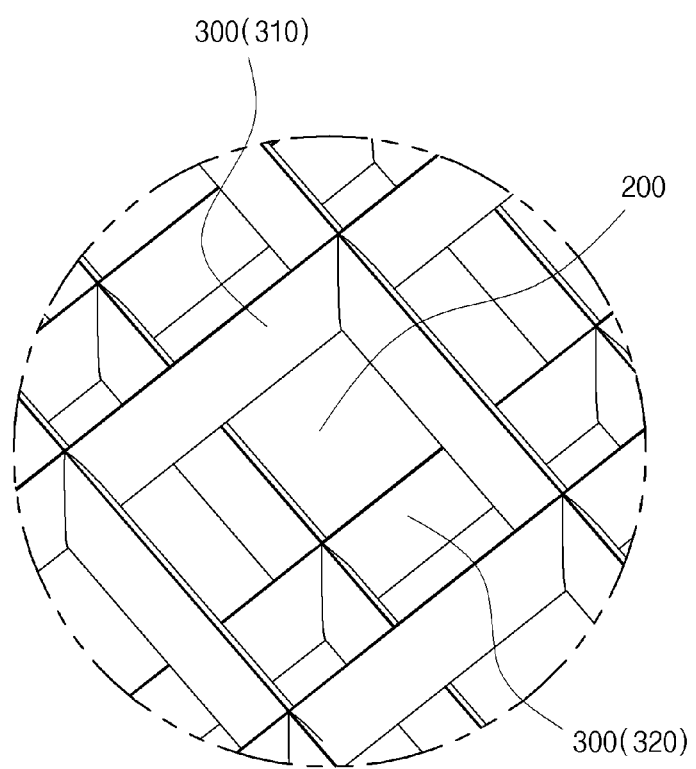
FIG. 4 is a perspective view showing a main portion of the bottom nozzle of the nuclear fuel assembly provided with flow holes by utilizing the layered aircraft airfoil structure according to the exemplary embodiment of the present invention.
Figure 5:
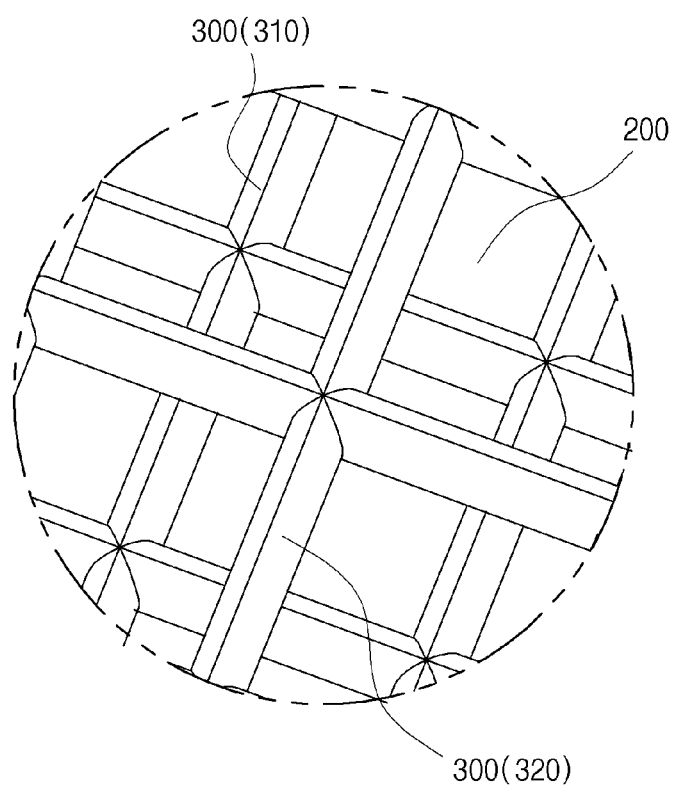
FIG. 5 is a bottom perspective view showing the main portion of the bottom nozzle of the nuclear fuel assembly provided with flow holes by utilizing the layered aircraft airfoil structure according to the exemplary embodiment of the present invention.
Figure 6:
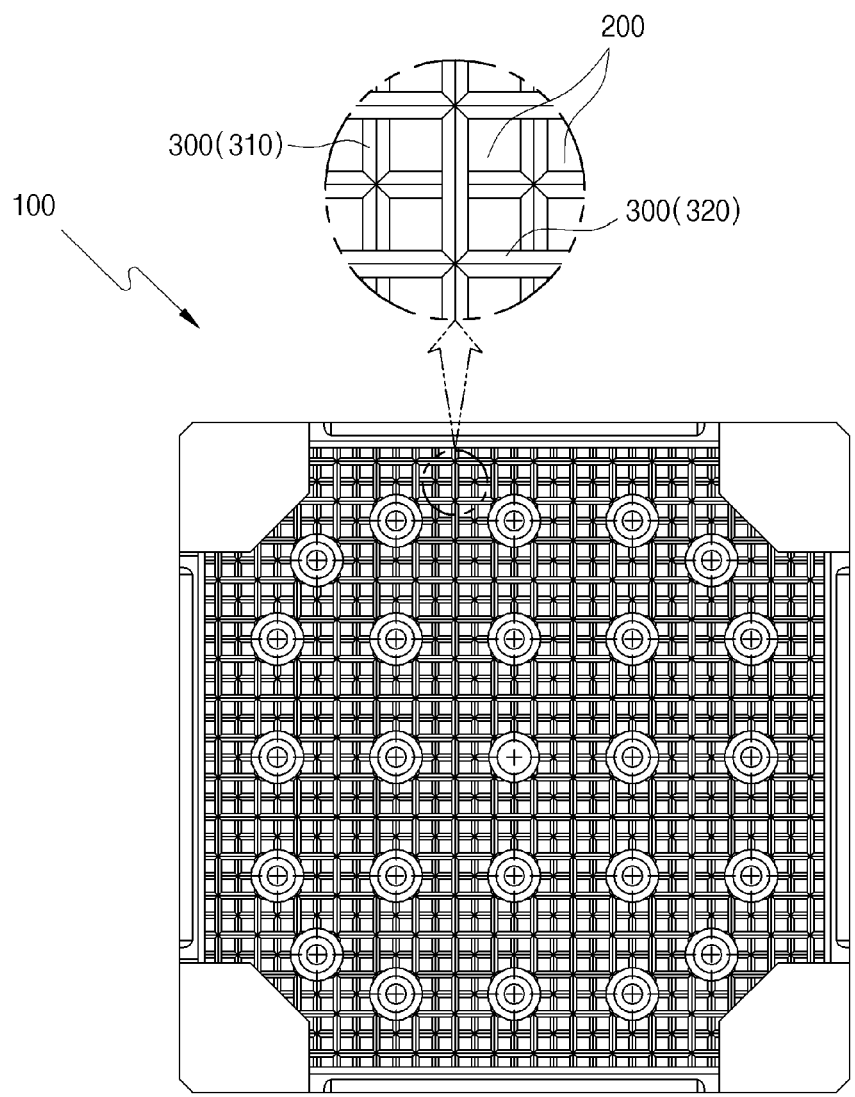
FIG. 6 is a bottom view showing the bottom nozzle of the nuclear fuel assembly provided with flow holes by utilizing the layered aircraft airfoil structure according to the exemplary embodiment of the present invention.
Figure 7:
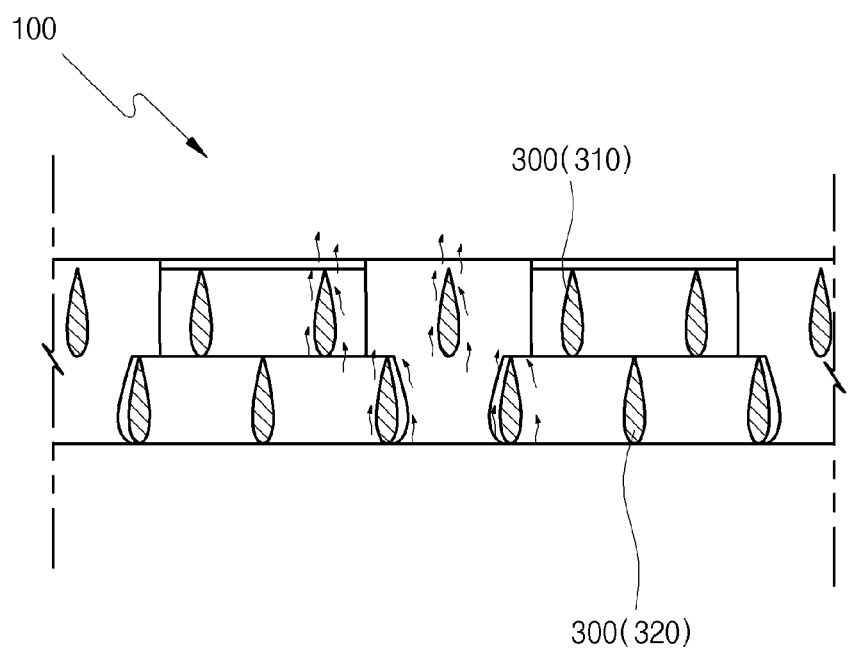
FIG. 7 is a sectional view showing the main portion of the bottom nozzle of the nuclear fuel assembly provided with flow holes by utilizing the layered aircraft airfoil structure according to the exemplary embodiment of the present invention.

More precisely, as shown in FIGS. 4 and 7, the lateral sectional shape of the grid frames 300 is provided in a shape of an aircraft airfoil, wherein the lateral sectional shape is curved to expand from a direction coolant water flows in and then to become pointy by being tapered again.

That is, even when the bottom nozzle 100 is provided to have a small size of the flow holes 200 due to the construction in the shape of the cross stripes, with the grid frames 300 as references, the coolant water flows from each of both sides when passing through the flow holes 200, and is then guided along the curved shape of the grid frames 300. Subsequently, the coolant water merged at a pointy portion of the grid frames 300 flows toward the fuel rods, so a phenomenon in which the pressure drops when the coolant water flows into a fuel rod region does not occur.

Accordingly, as the coolant water flows smoothly through the flow holes 200 without having a reduction of the flow velocity, both efficiency of preventing cooling water pressure drop and the efficiency of filtering foreign substances may be increased.

The flow holes 200 configured as described above may be minimized due to the stacked configuration of the first grid frames 310 and the second grid frames 320.

In addition, the lateral sectional shape of the grid frames 300 constituting a shape of the cross stripes is provided in a streamlined one in a direction where the coolant water flows, thereby preventing the pressure from dropping when the coolant water flows in.

Due to such a configuration, as shown in FIG. 7, the coolant water flowing in through the flow holes 200 flows along the curved portion of the grid frames 300, merges at the pointy portion of the grid frames 300, and then flows out toward the fuel rods. In this case, the pressure drop is prevented in the same way as air flow at the aircraft airfoil passes without a pressure drop, whereby the coolant water flow velocity is not reduced. Accordingly, the efficiency of filtering the foreign substances may be maximized due to a configuration of the compact flow holes 200.

As described above, the bottom nozzle of the nuclear fuel assembly provided with flow holes by utilizing a layered aircraft airfoil structure constitutes the flow holes in the shape of cross stripes, wherein the grid frames are constructed by being stacked and crossing one another, and the lateral sectional shape of the grid frames is applied with an aircraft airfoil shape.

Accordingly, it is possible to maximize the efficiency of filtering the foreign substances while maintaining the coolant water flow velocity as it is.

Although the present invention has been described in detail with respect to the described embodiments, it will be apparent to those skilled in the art that various modifications and variations are possible within the technical scope of the present invention, and such modifications and variations are within the scope of the appended claims.

What is claimed is:

1. A bottom nozzle of a nuclear fuel assembly provided with flow holes, the bottom nozzle of the nuclear fuel assembly comprising:
    a plurality of flow holes formed in a shape of cross stripes, wherein
    a plurality of grid frames constituting the cross stripes are stacked while crossing the flow holes, thereby minimizing the size of the flow holes, wherein the grid frames are constructed by stacking first grid frames and second grid frames, and
    a lateral sectional shape of the grid frames is provided to be curved to expand from a tapered form in the direction coolant water flows in and then to return to being tapered again by becoming pointy.

* * * * *